(12) United States Patent
Cilliers

(10) Patent No.: US 7,324,408 B2
(45) Date of Patent: Jan. 29, 2008

(54) REPELLING PESTS

(76) Inventor: Gerhardus Cilliers, Castille Villa 17, Rhino Street, Hennopspark (ZA) 0157

( * ) Notice: Subject to any disclaimer, the term of this patent is extended or adjusted under 35 U.S.C. 154(b) by 0 days.

(21) Appl. No.: 11/279,638

(22) Filed: Apr. 13, 2006

(65) Prior Publication Data
US 2006/0233049 A1 Oct. 19, 2006

(30) Foreign Application Priority Data
Apr. 14, 2005 (ZA) ............................. 2005/01555

(51) Int. Cl.
*H04B 1/02* (2006.01)
(52) U.S. Cl. .................... 367/139; 340/384.2
(58) Field of Classification Search ................ 367/139; 340/573.2, 384.2
See application file for complete search history.

(56) References Cited

U.S. PATENT DOCUMENTS

| | | | |
|---|---|---|---|
| 3,872,472 A * | 3/1975 | Moschgat | 367/139 |
| 3,893,106 A | 7/1975 | Schulein | |
| 4,186,387 A * | 1/1980 | Moschgat | 367/139 |
| 4,284,845 A | 8/1981 | Belcher | |
| 4,338,593 A | 7/1982 | Mills | |
| 4,414,653 A | 11/1983 | Pettinger | |
| 4,669,424 A * | 6/1987 | Bianco et al. | 367/139 |
| 4,802,057 A | 1/1989 | Patterson et al. | |
| 4,933,918 A | 6/1990 | Landsrath et al. | |
| 4,999,818 A | 3/1991 | Malleolo | |
| 5,208,787 A | 5/1993 | Shirley | |
| 5,214,411 A | 5/1993 | Herbruck | |
| 5,418,518 A | 5/1995 | Schenken et al. | |
| 5,463,595 A | 10/1995 | Rodhall et al. | |
| 5,598,379 A | 1/1997 | Malleolo | |
| 5,793,706 A | 8/1998 | Waletzky et al. | |
| 5,832,657 A | 11/1998 | Jan | |
| 5,864,516 A | 1/1999 | Brown et al. | |
| 6,016,100 A | 1/2000 | Boyd et al. | |
| 6,104,283 A | 8/2000 | Otomo | |
| 6,134,184 A | 10/2000 | Waletzky et al. | |
| 6,166,996 A | 12/2000 | Grissom et al. | |
| 6,226,933 B1 | 5/2001 | Nelson et al. | |
| 6,250,255 B1 | 6/2001 | Lenhardt et al. | |
| 6,301,194 B1 | 10/2001 | Cauchy | |

FOREIGN PATENT DOCUMENTS

WO  WO 94/06287  *  3/1994

* cited by examiner

*Primary Examiner*—Ian J. Lobo
(74) *Attorney, Agent, or Firm*—Wood, Herron & Evans, LLP

(57) ABSTRACT

The invention relates to a pest repelling apparatus which is installable in a vehicle (10). The pest repelling apparatus includes a control unit (12), a plurality of transducers (20) operatively connectable to the control unit (12) to emit sound at an ultrasonic frequency, mounting means to mount the transducers to the vehicle (10) at spaced apart locations, and an electrical connector arrangement (14) to connect the control unit (12) to a power source of the vehicle. The invention extends to a vehicle (10) which includes a pest repelling apparatus installed therein. The pest repelling apparatus includes a control unit (12), and a plurality of transducers (20) operatively connected to the control unit (12) and positioned at spaced apart locations in the vehicle (10), the control unit (12) in use causing the transducers (20) to emit sound at an ultrasonic frequency.

10 Claims, 3 Drawing Sheets

REPELLING PESTS

FIELD OF THE INVENTION

THIS INVENTION relates to a pest repelling apparatus, and to a vehicle having a pest repelling apparatus installed therein.

SUMMARY OF THE INVENTION

According to one aspect of the invention, there is provided a pest repelling apparatus which is installable in a vehicle, the pest repelling apparatus including:
  a control unit;
  a plurality of transducers operatively connectable to the control unit to emit sound at an ultrasonic frequency;
  mounting means to mount the transducers to the vehicle at spaced apart locations; and
  an electrical connector arrangement to connect the control unit to a power source of the vehicle.

The mounting means may include a harness having the transducers fixed thereto at spaced apart locations and fixing means configured to fix the harness to the vehicle. The fixing means may be an adhesive material, for example glue or double-sided tape.

According to another aspect of the invention, there is provided a vehicle which includes a pest repelling apparatus installed therein, the pest repelling apparatus including:
  a control unit; and
  a plurality of transducers operatively connected to the control unit and positioned at spaced apart locations in the vehicle; the control unit in use causing the transducers to emit sound at an ultrasonic frequency.

In this specification, the term 'vehicle' refers to any land-, air-, or sea vehicle. Conveniently, the vehicle may be a land based motor vehicle, such as a freight vehicle (for example a truck) or a passenger vehicle (for example a sedan or SUV). In other embodiments, the vehicle may be a boat, aeroplane, helicopter, or the like. The term 'pests' includes rodents (particularly rats) and insects (particularly termites).

There may be at least 12 transducers. The transducers may be piezoelectric transducers. The piezoelectric transducers may be operable to emit sound in a frequency range of between about 20 kHz and about 60 kHz, preferably between about 20 kHz to about 45 kHz. The pest repelling apparatus may include up to about 100 piezoelectric transducers. The control unit may have a power output of about 40 W.

The control unit may include a digital signal processor (DSP). The DSP may be programmable. In such a case, the control unit may include a computer interface from which the DSP is programmable. The computer interface may be in the form of a USB port or the like. Instead, or in addition, the DSP may be pre-programmed.

The control unit may include a memory module operable to store thereon at least one pre-defined waveform. The control unit may be upgradeable to receive additional memory modules or a larger memory module. The DSP may generate at least one waveform selected from the group comprising frequency modulation, amplitude modulation, phase modulation, amplitude shift keying, frequency shift keying, direct spread spectrum, random chaos, and sine wave sweep. In this context, the term modulation refers to changing or varying at least one parameter of the generated waveform over time. A plurality of parameters (for example frequency, amplitude, and phase) may be modulated or varied over time so that the pests are less likely to develop tolerance to the sound. The memory module may further store thereon the parameters which are to be modulated or varied.

The control unit, and particularly the DSP, may be operable to generate a waveform which repetitively sweeps from one end of the frequency range to the other end of the frequency range. More particularly, the wave form may sweep from a lower frequency to an upper frequency range. The period of the sweep may randomly vary between about 1 ms and about 1 s. The lower frequency may be about 20 kHz and the upper frequency may be about 45 kHz.

The electrical connector may be connectable to a battery of the vehicle. The control unit is preferably connected to the battery via a fuse-box of the vehicle. The control unit may be operable to monitor power output of the battery of the vehicle. The control unit may include a power saving mode. The power saving mode may be invoked by the control unit in response to the power output of the battery falling below a threshold.

The control unit may include a toggle switch to vary the control unit between a test state and an operative state. In the test state, the control unit may cause the transducers to emit sound at frequencies audible to humans, thereby providing an indication that the control unit is functioning. In the operative state, the control unit may cause the transducers to emit sound at ultrasonic frequencies. The control unit may include an indicator, for example an LED (Light Emitting Diode) to indicate that the control unit is powered.

The transducers may be spaced apart from one another in a grid- or lattice-like spacing throughout a zone, to repel pests from the zone. There may be at least ten transducers per cubic meter of the zone from which pests are to be repelled.

The vehicle may be a motor vehicle. The transducers may be directed towards an engine compartment of the vehicle. The transducers may be mounted to an underside of a bonnet or hood of the vehicle. The pest repelling apparatus may be one of factory-fitted to the vehicle and retrofitted to the vehicle. The pest repelling apparatus is conveniently factory-fitted by the vehicle manufacturer into the vehicle.

The control unit may be proximate the transducers, for example if the transducers are in an engine compartment of a motor vehicle. The control unit may also be in the engine compartment. Instead, the control unit may be remote from the transducers, for example if the transducers are in an engine compartment of a motor vehicle, the control unit may be in a cabin or glove compartment of the motor vehicle.

The vehicle may include a pest repelling apparatus as above defined.

BRIEF DESCRIPTION OF THE DRAWINGS

The invention will be further described, by way of example, with reference to the accompanying diagrammatic drawings, in which.

DETAILED DESCRIPTION OF THE PREFERRED EMBODIMENT

Figure 1:
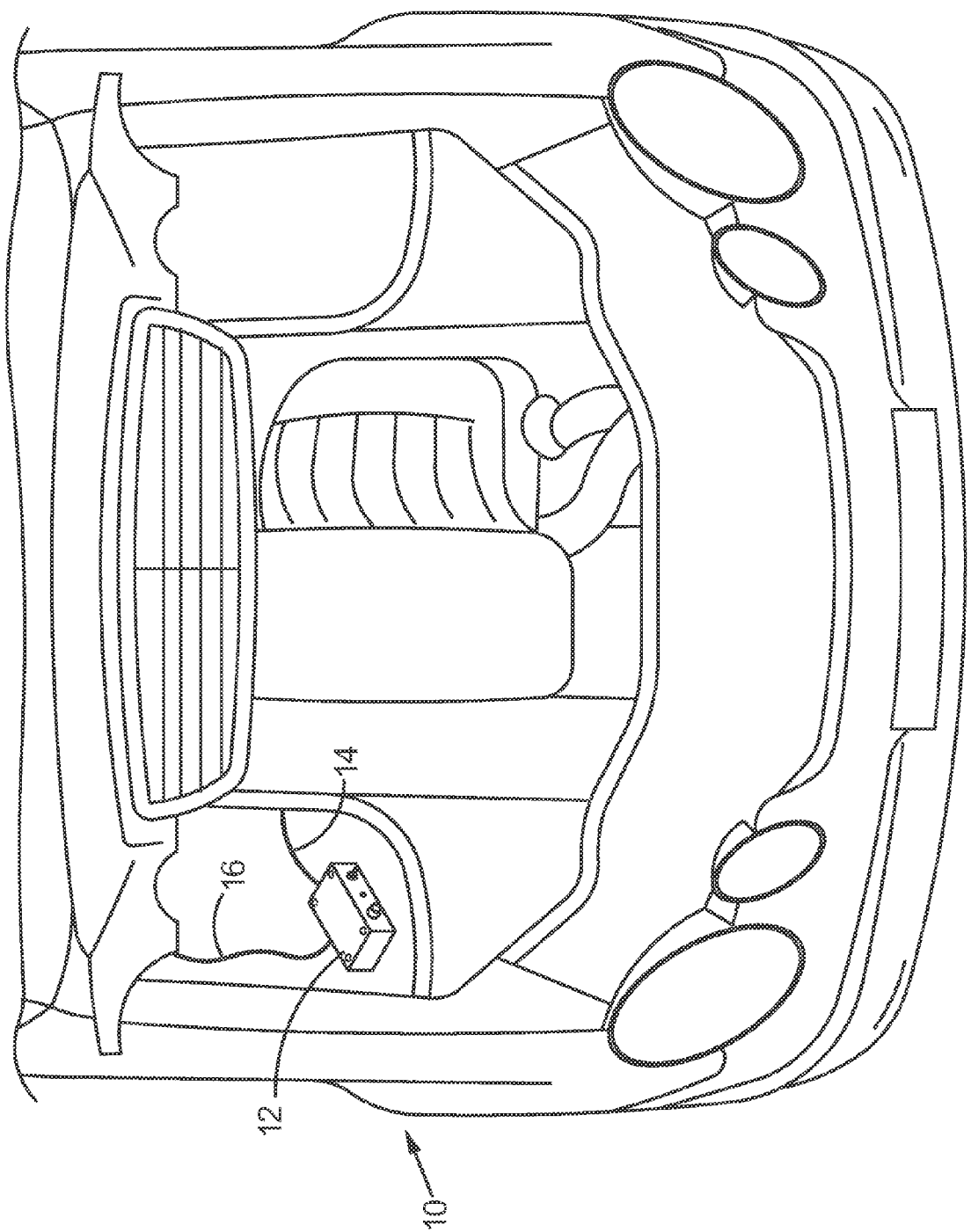
FIG. 1 shows a three-dimensional view from above of a portion of a vehicle having a pest repellent apparatus installed therein, in accordance with the invention.

Referring to FIG. 1, reference numeral 10 generally indicates a vehicle, specifically a passenger motor vehicle, having a pest repellent apparatus installed therein, in accordance with the invention. A front end of the vehicle 10 is shown, particularly the engine and engine compartment. In this example, therefore, the zone to be protected is the engine compartment of the vehicle 10.

Figure 2:
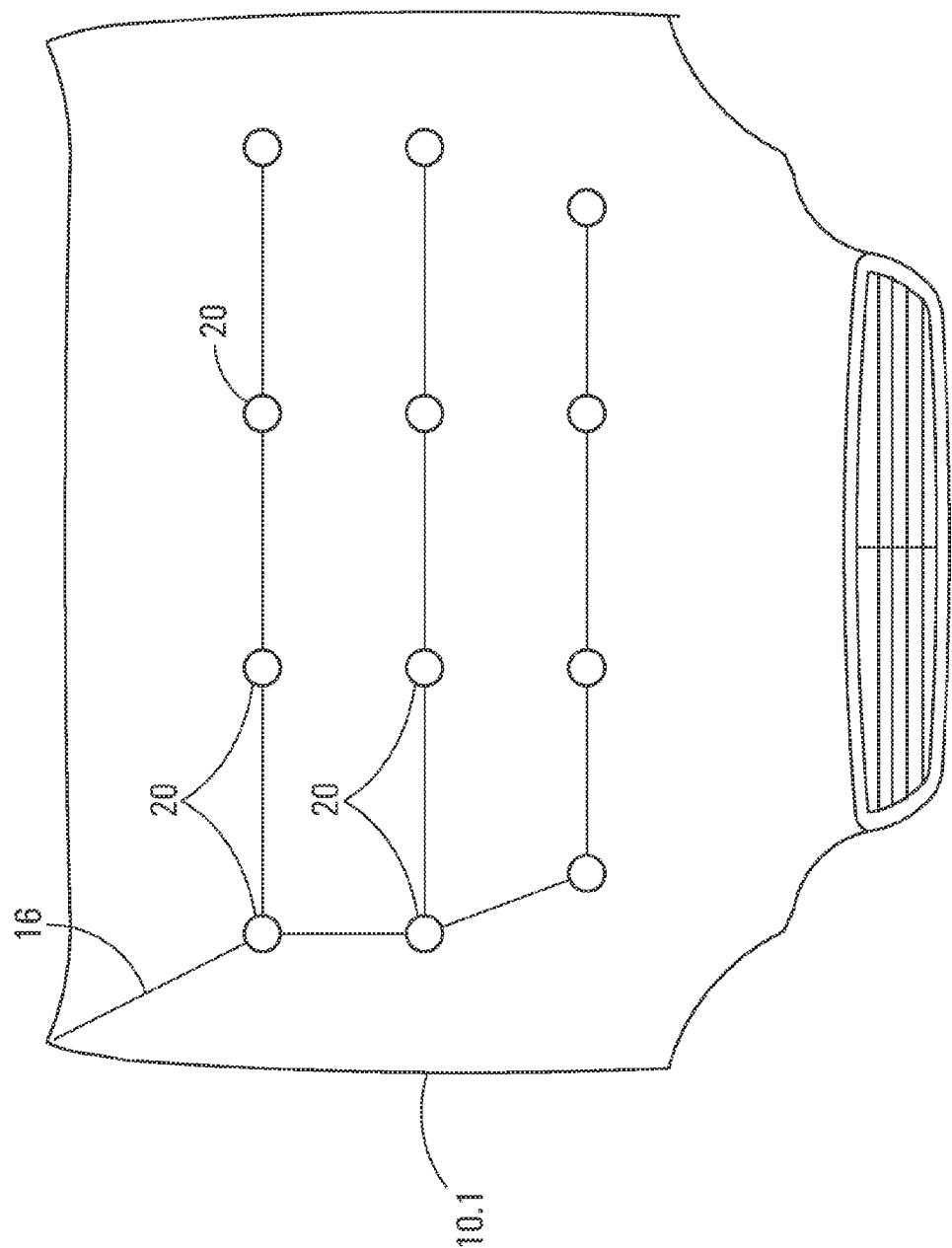
FIG. 2 shows a three-dimensional view from below of another portion of the vehicle of FIG. 1.

The pest repellent apparatus includes a control unit 12, an electrical connector 14 to connect the control unit 12 to a battery (not shown) of the vehicle 10, and a plurality of transducers particularly ultrasonic transducers 20 (refer to FIG. 2).

The control unit 12 includes a case made of a synthetic plastics material, for example PVC (Polyvinyl Chloride), which is moisture and temperature resistant.

Referring now also to FIG. 2, an underside of a bonnet 10.1 of the vehicle 10 is shown. The ultrasonic transducers are in the form of piezoelectric transducers 20, which are connected in parallel via electric wires 16 to the control unit 12. The piezoelectric transducers 20 are attached to the underside of the bonnet 10.1, such that when the bonnet 10.1 is closed the piezoelectric transducers 20 are directed downwardly into the engine compartment. The piezoelectric transducers 20 have a grid-like spacing to provide roughly uniform coverage of the engine compartment. The piezoelectric transducers 20 are attached to the underside of the bonnet 10.1 by attachment means in the form of an adhesive, for example double-sided adhesive tape.

Figure 3:
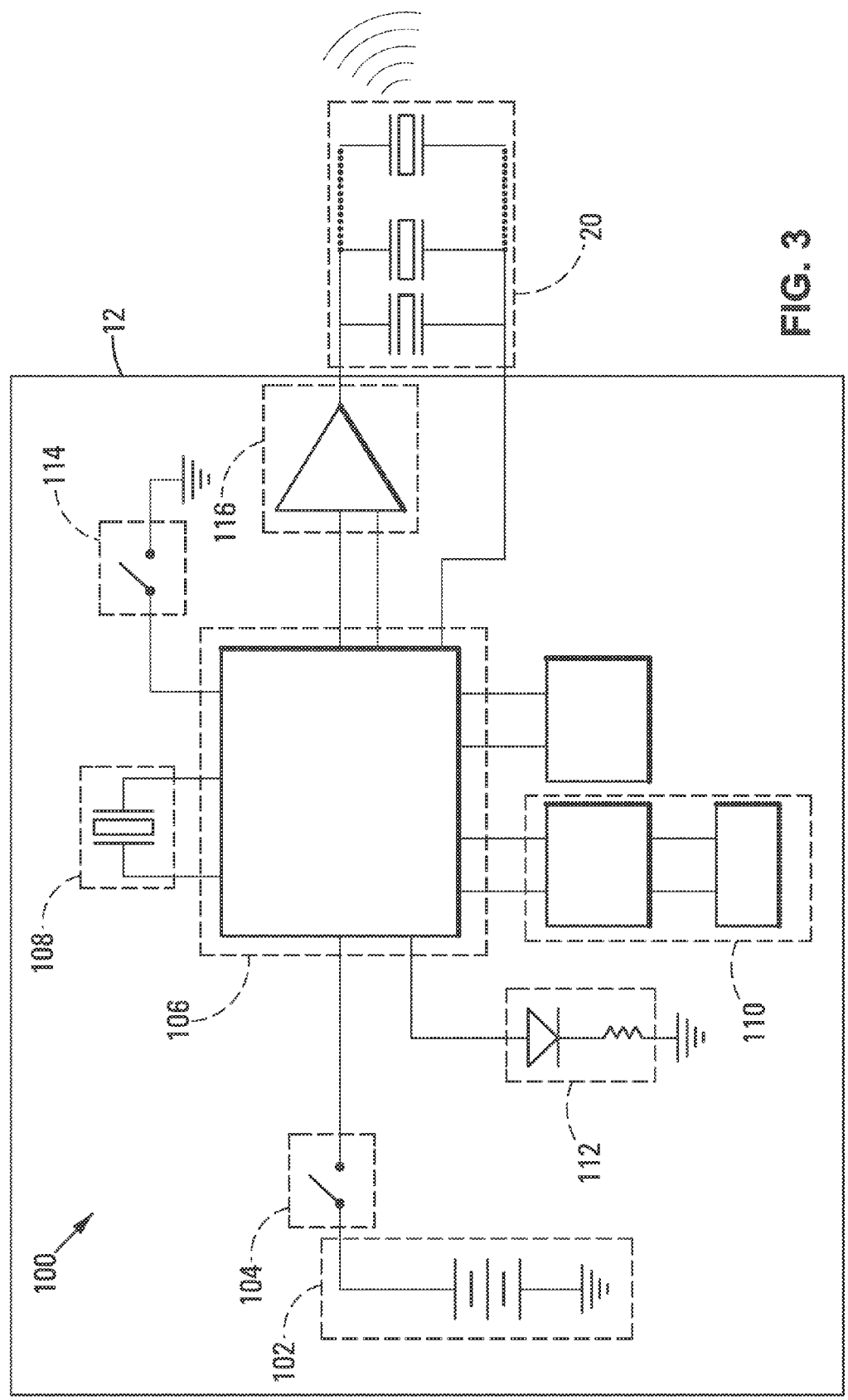
FIG. 3 shows a schematic view of circuit of the pest repellent apparatus of FIG. 1.

Referring now to FIG. 3, a circuit 100 of the control unit 12 is schematically shown. The pest repelling apparatus includes a power source 102. In the example embodiment, the power source is the battery of the vehicle 10, but in another embodiment (not shown) the control unit 12 includes a self-contained power source, for example a dedicated rechargeable battery. The control unit 12 includes a power switch 104 which is operable to activate and deactivate the control unit 12. The switch 104 is mounted on the case of the control unit 12.

The control unit 12 further includes a DSP 106, a signal generator or oscillator 108, a computer interface 110, an indicator 112, a toggle switch 114, and an amplifier 116. The DSP 106 is programmed to generate a waveform which repetitively sweeps or increases from a lower frequency of 20 kHz to an upper frequency of 45 kHz. The DSP 106 randomly (or pseudo-randomly) and continuously varies the period of the sweep between 1 ms and 1 s. The oscillator 108 is used by the DSP 106 as a reference frequency.

The control unit 12 is connectable via the computer interface 110 to program the DSP 106, and/or to store various pre-defined waveforms in the memory module (not shown) of the control unit 12. The control unit 12 is therefore also operable to emit any of the pre-defined waveforms stored in the memory module.

The indicator 112 is in the form of an LED to provide a visual indication that the control unit 12 is operative. The toggle switch 114 is operable to change the frequency of the emitted sound from ultrasonic frequency to a frequency audible by humans (<20 kHz) to provide an audible indication that the control unit 12 is operational, and to indicate what type of waveform the control unit 12 is producing.

An amplifier 116 (for example in the form of an op amp) amplifies the waveform or signal from the DSP 106 to the piezoelectric transducers 20. Although typically at least 12 piezoelectric transducers 20 are used, more can be connected in series to the control unit 12 if wider and/or more penetrative coverage is required.

In use, the pest repelling apparatus is installed into the vehicle 10 at a factory either during manufacturing of the vehicle 10 or subsequently. The electrical connector 14 is connected to the battery of the vehicle 10 via a fuse-box (not shown) to power the control unit 12. The control unit 12 is mounted in the engine compartment of the vehicle 10. The piezoelectric transducers 20 are fixed, by adhesive, to the underside of the bonnet 10.1, and are electrically connected to the control unit 12 via electric wires 16.

A user turns on the power switch 114 to activate the control unit 12, and the indicator 112 indicates that the control unit 12 is powered. The user may toggle the toggle switch 116 which causes sound to be emitted at audible frequencies, so that the user can hear that the pest repelling apparatus is properly functioning. The user toggles the toggle switch 116 once more, so that sound is emitted at ultrasonic frequencies into a zone in front of the piezoelectric transducers 20. The user then closes the bonnet 10.1 (therefore the piezoelectric transducers 20 emit sound into the engine compartment) and may leave the vehicle 10 unattended.

The ultrasonic sound is irritating to pests, particularly rodents. Rodents are therefore repelled from the engine cavity, therefore not building nests or damaging engine components. The DSP 106 continually varies the frequency and pulse lengths of the emitted sound, thereby inhibiting pests from developing a tolerance towards the sound.

The Inventor believes that the invention as exemplified has the advantages providing a vehicle with a low-cost, easy-to-install pest repelling apparatus. The apparatus inhibits pests from nesting in vehicles, and damaging components of the vehicle, particularly rubber components, such as hoses, and insulation material around the engine compartment.

Having described the invention, I claim:

1. A vehicle which includes a pest repelling apparatus installed therein, the pest repelling apparatus including:
   a control unit;
   a plurality of transducers operatively connected to the control unit and positioned at spaced apart locations in the vehicle, the transducers further being directed towards an engine compartment of the vehicle;
   the control unit in use causing the transducers to emit sound at an ultrasonic frequency; and
   the vehicle is a motor vehicle in which the transducers are mounted to an underside of a bonnet of the motor vehicle.

2. A vehicle as claimed in claim 1, which includes at least twelve transducers and in which the transducers are piezoelectric transducers.

3. A vehicle as claimed in claim 1, in which the control unit includes a digital signal processor.

4. A vehicle as claimed in claim 3, in which the digital signal processor is programmable.

5. A vehicle as claimed in claim 1, in which the control unit includes a memory module to store thereon at least one pre-defined waveform.

6. A vehicle as claimed in claim 1, in which the control unit is operable to generate a waveform which repetitively sweeps from one end of a frequency range to another end of the frequency range.

7. A vehicle as claimed in claim 6, in which the control unit randomly varies a period of the sweep between 1 ms and 1 s and in which a lower frequency is 20 kHz and an upper frequency is 45 kHz.

8. A vehicle as claimed in claim 1, in which the transducers are spaced apart from one another in a grid- or lattice-like spacing.

9. A vehicle as claimed in claim 8, which includes at least ten transducers per cubic meter of the engine compartment.

10. A vehicle as claimed in claim 1, which includes a cover over the engine compartment, the transducers being mounted on an underside of the cover.

* * * * *